(12) United States Patent
Gralow et al.

(10) Patent No.: US 9,156,634 B2
(45) Date of Patent: Oct. 13, 2015

(54) SYSTEM AND METHOD FOR DETECTING AND FURTHER PROCESSING THE POSITION OF AT LEAST ONE STORAGE SPACE DEVICE MOVING BULK MATERIAL

(71) Applicants: ABB AG, Mannheim (DE); Mitteldeutsche Braunkohlengesellschaft mbH, Zeitz (DE)

(72) Inventors: Bernd Gralow, Forst (DE); Klaus Holzbecher, Wiesengrund (DE); Dietmar Müller, Boma (DE)

(73) Assignees: ABB AG, Mannheim (DE); MITTELDEUTSCHE BRAUNKOHLENGESELLSCHAFT MBH, Zeitz (DE)

( * ) Notice: Subject to any disclaimer, the term of this patent is extended or adjusted under 35 U.S.C. 154(b) by 0 days.

(21) Appl. No.: 14/589,111

(22) Filed: Jan. 5, 2015

(65) Prior Publication Data

US 2015/0120038 A1 Apr. 30, 2015

Related U.S. Application Data

(63) Continuation of application No. PCT/EP2013/001924, filed on Jul. 2, 2013.

(30) Foreign Application Priority Data

Jul. 5, 2012 (DE) .......................... 10 2012 013 282

(51) Int. Cl.
*G06F 7/00* (2006.01)
*G06F 19/00* (2011.01)

(Continued)

(52) U.S. Cl.
CPC .............. *B65G 65/005* (2013.01); *B65G 43/02* (2013.01); *B65G 65/06* (2013.01); *G01S 13/874* (2013.01);

(Continued)

(58) Field of Classification Search
None
See application file for complete search history.

(56) References Cited

U.S. PATENT DOCUMENTS 4,095,160 A * 6/1978 Sedlmayer et al. ........... 318/675
2010/0228513 A1 * 9/2010 Roth et al. ...................... 702/94

(Continued)

FOREIGN PATENT DOCUMENTS

DE 2528293 A1 1/1977
DE 2841269 B1 12/1979

(Continued)

OTHER PUBLICATIONS

International Search Report (PCT/ISA/210) mailed on Jul. 17, 2014, by the European Patent Office as the International Searching Authority for International Application No. PCT/EP2013/001924.

*Primary Examiner* — Yolanda Cumbess
(74) *Attorney, Agent, or Firm* — Buchanan Ingersoll & Rooney PC

(57) ABSTRACT

A system and method are disclosed, which can detect and process a position of at least one storage space device moving a bulk material. A first storage space device can have a gantry having two gantry legs, each of the two gantry legs supported on a linearly displaceable foot element. The system can include at least one first non-contact distance sensor, which is fitted on one of the two foot elements to measure a first relative distance between the one foot element and a first fixed reference point. A second non-contact distance sensor is fitted to the other of the two foot elements in order to measure a second relative distance between the other foot element and a second fixed reference point, and an evaluation unit is configured to determine rotation of the first storage space device about a central vertical axis and control the movement of the foot elements.

20 Claims, 3 Drawing Sheets

(51) Int. Cl.
  *B65G 65/00* (2006.01)
  *G01S 13/87* (2006.01)
  *G05D 1/02* (2006.01)
  *B65G 43/02* (2006.01)
  *B65G 65/06* (2006.01)

(52) U.S. Cl.
  CPC ............... *G05D 1/02* (2013.01); *G05D 1/0248* (2013.01); *G05D 1/0255* (2013.01); *G05D 1/0257* (2013.01); *B65G 2812/02108* (2013.01); *B65G 2812/02267* (2013.01); *G05D 2201/0205* (2013.01)

(56) References Cited

U.S. PATENT DOCUMENTS

2011/0066279 A1\* 3/2011 Wysocki .................. 700/218
2015/0027039 A1\* 1/2015 Laskowski et al. ............ 44/603

FOREIGN PATENT DOCUMENTS

| | | |
|---|---|---|
| DE | 10024039 A1 | 11/2001 |
| EP | 0490012 A1 | 6/1992 |
| JP | 2002-362709 A | 12/2002 |
| WO | WO 01/57553 A1 | 8/2001 |

\* cited by examiner

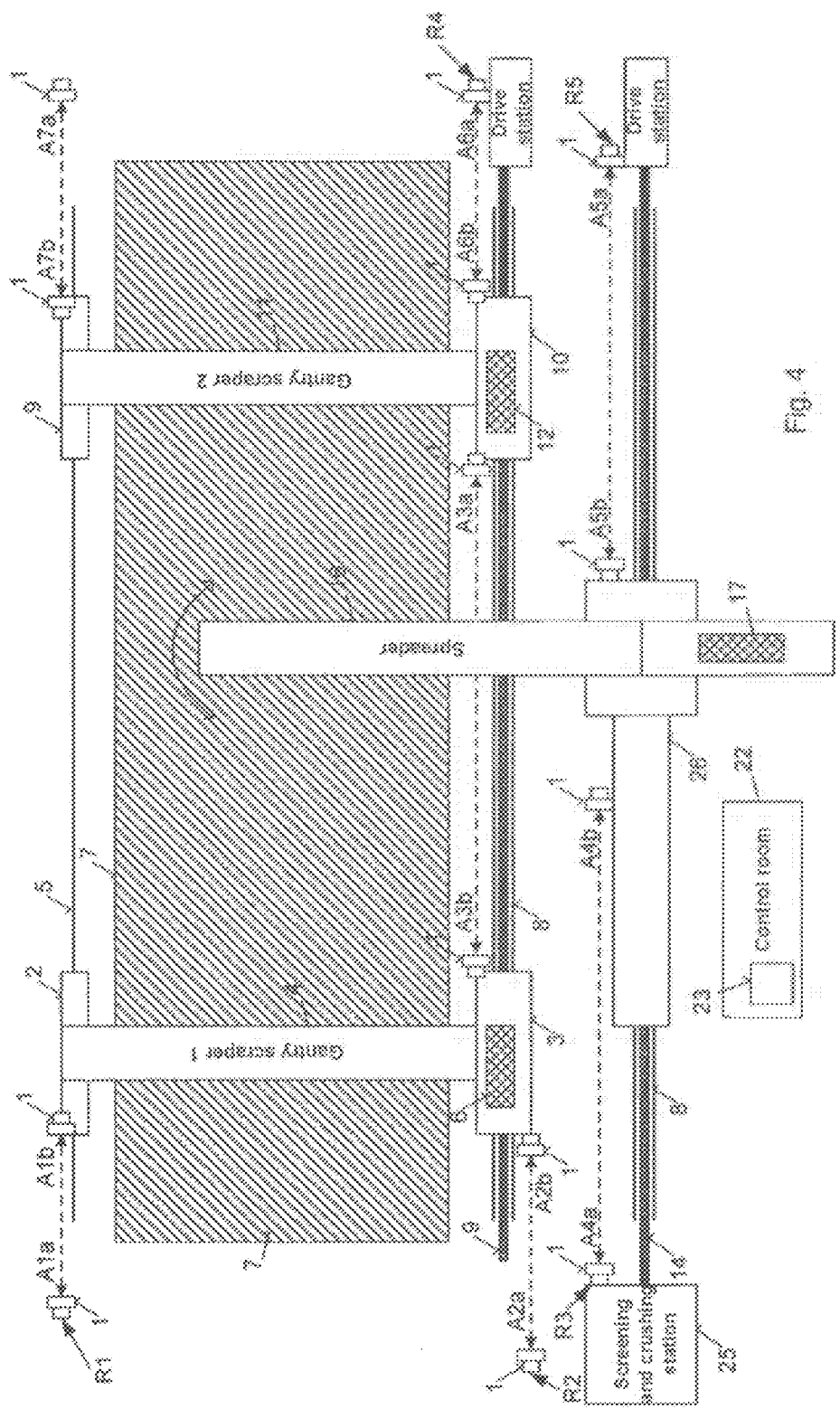

SYSTEM AND METHOD FOR DETECTING AND FURTHER PROCESSING THE POSITION OF AT LEAST ONE STORAGE SPACE DEVICE MOVING BULK MATERIAL

RELATED APPLICATION(S)

This application claims priority as a continuation application under 35 U.S.C. §120 to PCT/EP2013/001924, which was filed as an International Application on Jul. 2, 2013, designating the U.S., and which claims priority to European Application 10 2012 013 282.4 filed in Europe on Jul. 5, 2012. The entire contents of these applications are hereby incorporated by reference in their entireties.

FIELD

The disclosure relates to a system and method for detecting and processing the position of at least one storage space device moving bulk material, wherein a first storage space device can have a gantry with two gantry legs with a span of at least several meters, and wherein the two gantry legs of the gantry are each supported on a foot element which can be displaceable in a translatory fashion. The system can include at least one first contactless distance sensor for measuring a relative distance in the direction between a measuring point located on the first storage space device, and a reference point located outside the first storage space device.

BACKGROUND INFORMATION

A system in which the relative distance between a gantry device and a measuring point located outside the gantry device is determined is described, for example, in the datasheet from Symeo in relation to the sensor system LPR-1 DX, wherein the datasheet can be found online at http://www.symeo.com/Deutsch/Downloads/Download-Symeo-Datenblaetter.html. The designation LPR stands for Local Positioning Radar. The radar sensor system LPR-1 DX is based on the principle of transit time measurement of radio waves and can serve to determine distances, for example, relative distances, between two objects. The radar senor system is a contactless system for measuring distances. For example, in the specified datasheet there is a graphic illustration of a gantry crane, for example, in container ports. A radar sensor can be mounted on the gantry crane. A crane bridge can be arranged in such a way that the crane bridge can move in relation to the gantry crane and a radar sensor. The two radar sensors can determine the distance from the respective other sensor, for example, the distance between the gantry crane and the crane bridge can be determined in a redundant fashion. The datasheet proposes use of the radar sensor system LPR-1 DX to help avoid collisions and prevent the gantry crane and crane bridge moving unacceptably close to one another.

Furthermore, on the Internet page www.symeo.com/Deutsch/Schuettgut, the page recommends that the LPR sensors can be used to locate and measure movement when handling bulk material. Bulk material can be understood below to mean loose material which can be acquired by removal processes, and is then intermediately stored at what can be referred to as bulk material storage spaces, these materials being, for example, coal, ore, sand or gravel. The transportation of the bulk material to the storage location and the storage of the bulk material in heaps of bulk material, and the removal from storage and transportation away can be performed by what can be referred to as storage space devices, such as, for example, cranes, excavators, spreaders and conveyor belts. Symeo determines the movements of the storage space devices at such bulk material storage spaces by means of linear distance measurement using radar sensors, or an absolute position determining process by means of a combination of GPS with radar sensors. The combination of GPS with radar sensors can be used in the case of automated machine movements to help avoid collisions between the storage space devices.

In the dissertation by Sergiy A. Kaverynskyy, "Zustandsorientierte Instandhaltung und Teleservice für Schüttgut-Materialflusssysteme" [State-oriented maintenance and teleservice for bulk material flow systems], ISBN-10: 3930385422, ISBN-13: 978-3930385423, a coal-handling system is described, which can continuously supply a coal power station. The coal can be intermediately stored at a bulk material storage space before being transported on in the direction of the power station, and can be mixed at the bulk material storage space such that the ash content and the heating value of the coal introduced into the power station corresponds to predefined values. The bulk material storage space can also be referred to as a coal mixing and storage yard. For example, two storage space device types can be active at the coal mixing and storage yard. A spreader for piling up one or more heaps of coal and a gantry scraper for removing the coal from storage, for example for conveying the coal from the coal heap to a conveyor belt. As described, the spreader and the gantry scraper travel on rails, which can be laid parallel to the heap of coal. The gantry scraper can have for this purpose, geared motors as running gear drive in the running gear of its two leg elements and associated foot elements, for example, combinations of the electric motor and gear mechanisms. Absolute rotary encoders can be used to determine the position of the gantry scraper, and the position can be in turn used to avoid collisions and to detect skewed running. Skewed running can be understood to mean that the two sides or legs of the gantry move at different distances along the rails, with the result that stresses can occur in the gantry structure and there can be an undesired application of force into the tracks of the rail lines. In order to avoid these stresses when a predefined deviation from the straight running is reached the speed of one of the running gear drives is changed in the downward or upward directions by negative or positive set point value implementation until the straight running can be restored.

SUMMARY

A system is disclosed for detecting and processing a position of at least one storage space device moving bulk material, wherein a first storage space device has a gantry having two gantry legs with a span of at least several meters, each of the two gantry legs being supported on a linearly displaceable foot element, the system comprising: at least one first contactless distance sensor for measuring a relative distance in a direction between a measuring point located on the first storage space device, and a reference point located outside the first storage space device, wherein the at least one first contactless distance sensor is mounted on one of the two linearly displaceable foot elements, for measuring a first relative distance between the one foot element and a first positionally fixed reference point; a second contactless distance sensor which is mounted on the other of the two linearly displaceable foot elements, for measuring a second relative distance between the other foot element and a second positionally fixed reference point; and an evaluation unit being configured to determine a rotation of the first storage space device about a central vertical axis from the first and second relative distances, and to pass on the rotation information or a compensation information serving to compensate the rotation, to at least one first control unit for controlling a movement of the linearly displaceable foot elements.

A system for detecting and processing a position of at least one storage space device moving bulk material, the system comprising: a first storage space device including a gantry having two gantry legs, each of the two gantry legs being supported on a linearly displaceable foot element; at least one first contactless distance sensor for measuring a relative distance in a direction between a measuring point located on the first storage space device, and a reference point located outside the first storage space device, wherein the at least one first contactless distance sensor is mounted on one of the two linearly displaceable foot elements, for measuring a first relative distance between the one foot element and a first positionally fixed reference point; a second contactless distance sensor which is mounted on the other of the two linearly displaceable foot elements, for measuring a second relative distance between the other foot element and a second positionally fixed reference point; and an evaluation unit being configured to determine a rotation of the first storage space device about a central vertical axis from the first and second relative distances, and to pass on the rotation information, or a compensation information serving to compensate the rotation, to at least one first control unit for controlling a movement of the linearly displaceable foot elements.

A method for detecting and processing a position of at least one storage space device moving bulk material, wherein the at least one storage space device has a gantry with two gantry legs with a span of at least several meters, each of the two gantry legs supported on a linearly displaceable foot element, the method comprising: measuring a relative distance between a measuring point located on a first storage space device, and a positionally fixed reference point located outside the first storage space device with at least one first contactless distance sensor; measuring a first relative distance between one of the two linearly displaceable foot elements and a first positionally fixed reference point with the first contactless distance sensor which is mounted on the one foot element; measuring a second relative distance between the other of the two foot elements and a second positionally fixed reference point with a second contactless distance sensor which is mounted on the other foot element; determining a rotation of the gantry about a central vertical axis from the first and the second relative distances; and passing the rotation information, or a compensation information serving to compensate the rotation, on to at least one control unit for controlling a movement of the two foot elements.

BRIEF DESCRIPTION OF THE DRAWINGS

The disclosure is explained below with reference to the exemplary embodiments shown in the drawings. In the drawings:

FIG. 4 shows a plan view of an exemplary coal mixing and storage yard in accordance with an exemplary embodiment.

DETAILED DESCRIPTION

Figure 1:
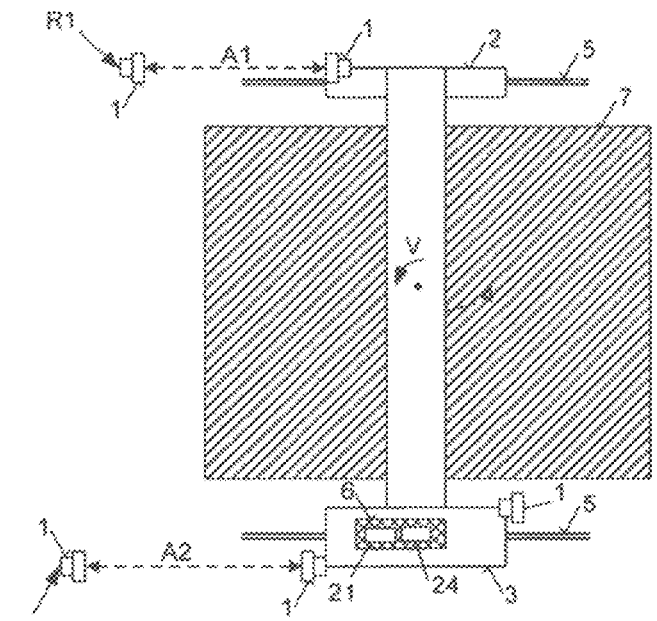
FIG. 1 shows a plan view of an exemplary first storage space device with a gantry and contactless distance sensors in accordance with an exemplary embodiment.

The present disclosure relates to a system and a method, which can be used during the detecting and processing of a position of a gantry device at a bulk material storage space.

In accordance with an exemplary embodiment, a system is disclosed which can include a first contactless distance sensor that can be mounted on one of the two foot elements of the gantry device, for measuring a first relative distance between the one foot element and a first, positionally fixed reference point. The system can also include a second contactless distance sensor that can be mounted on the other of the two foot elements, for measuring a second relative distance between the other foot element and a second, positionally fixed reference point. The system can include an evaluation unit, which can be configured to determine a rotation of the gantry about a central vertical axis from the first and second relative distances, and to pass on the rotation or a compensation information item, serving to compensate the rotation, to at least one first control unit for controlling the movement of the foot elements.

In accordance with an exemplary embodiment, a method is disclosed which can include the steps of: measuring a first relative distance between a measuring point located on the first storage space device, on one of the two foot elements, and a first positionally fixed reference point located outside the first storage space device, by means of at least one first contactless distance sensor, measuring a second relative distance between the other of the two foot elements and a second positionally fixed reference point located outside the first storage space device, by means of a second contactless distance sensor which can be mounted on the other foot element, determining a rotation of the gantry about a central vertical axis from the first and the second relative distances, and passing on the rotation or a compensation information item, serving to compensate the rotation, to at least one control unit for the purpose of correspondingly controlling the movement of the foot elements.

In accordance with an exemplary embodiment, the absolute rotary encoders can be used in the gantry scraper described therein, and operate according to the principle involved in a frictionally locking fashion and subject to slip, and can have a considerable dependence on weather as well as relatively large measuring errors. For example, for the frictionally locking encoders, the rails have to be gritted in the winter in order to avoid slipping.

In accordance with an exemplary embodiment, in order to set the straight running, calibration switches can be used, which can be present in pairs. For example, one switch can be mounted per gantry leg in a positionally fixed fashion at positions opposite one another along the rails. When an oblique position is present, only one of the gantry legs can repeatedly travel over an associated calibration switch in forward and backward directions. The currently detected skewed position of the gantry scraper can then be falsified by the one-sided calibration, with the result that the zero axis of the gantry scraper cam no longer form the calculation basis for the detection of a skewed position but instead the actual oblique position is calibrated as running straight. Calibration switches can also fail and therefore constitute an additional source of faults.

In accordance with an exemplary embodiment, the concept of basically using contactless distance sensors in a gantry device, such as, for example, a gantry scraper, instead of the absolute rotary encoder is disclosed. In addition, the distance sensors can be used to determine the relative position of the gantry sides with respect to one another and to determine a rotation of the gantry about its central vertical axis therefrom, which can use the measuring accuracy of contactless distance sensors, for example, those which are based on transit time measurement of radio signals, are not adversely affected by less advantageous ambient conditions and weather conditions and that such sensors have a significantly higher measuring accuracy than the absolute rotary encoders. Thus, the need for calibration switches can be eliminated.

Figure 2:
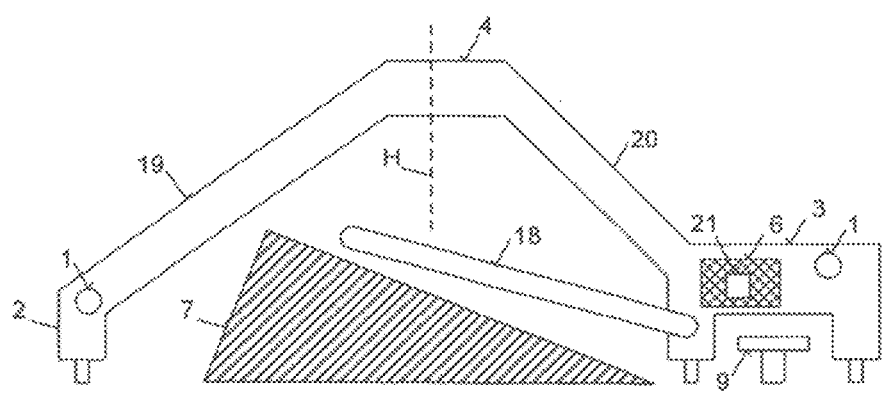
FIG. 2 shows a front view of the exemplary first storage space device.

FIGS. 1 and 2 show an exemplary first storage space device 4, which can have a gantry with a span of, for example, at least several meters, for example, in the range between 10 and 80 m. The gantry can have a first gantry leg 19 and a second gantry leg 20 which are each supported on a first or second foot element 2 or 3, which can be displaced linearly and therefore moved in a translatory fashion. The first and second foot elements 2 and 3 can each be displaceably arranged on rails 5.

The first storage space device 4 can span a heap of bulk material 7, for example, coal, sand, ore or gravel. The first storage space device 4 can be a gantry scraper, for example, the gantry scraper can have a scraper boom 18 about which a scraper chain can be guided. The scraper chain can pick up portions of the bulk material 7 at the free end of the scraper boom 18 and transports them to a conveyor belt system 9, as shown in FIGS. 2 and 4. A system 6 for electrically supplying and controlling the operation of the first storage space device 4 can be integrated into the second foot element 3, wherein the system 6 can include an evaluation unit 21 for evaluating sensor information and a first control unit 24 for performing open-loop or closed-loop control of the various movements of the first storage space device 4, for example, the foot elements 2 and 3, of the scraper boom 18 and of the scraper chain.

For example, in the case of gantry scrapers, the offset can be predefined. For example, given a span of, for example, 65 m, a warning of the skewed position can be output when there is an offset of the gantry legs 19 and 20 of, for example, 18 cm with respect to one another, which can be caused by a rotation V of the storage space device 4 about its central vertical axis H, and an offset of, for example, 23 cm the running gear, of the gantry scraper, which can be located in the foot elements can be switched off. As a result, the undesired force effects, which can result from the rotation V can be prevented both in the scraper structure and in the rails 5. In accordance with an exemplary embodiment, the accuracy can be comparatively high for the detection of the skewed position, and for example, significantly higher than the accuracy to help avoid a collision.

In accordance with an exemplary embodiment, in order to help ensure a relatively robust detection of the position or skewed position of the first storage space device 4, which detection operates with high measuring accuracy, a first contactless distance sensor 1 can be mounted on the first foot element 2, and a second contactless distance sensor 1 can be mounted on the second foot element 3, which distance sensors 1 can serve to measure a first or second relative distance $A1a$ and $A2a$, respectively, between the measuring point defined by the position of the respective distance sensor 1 on the foot element and an associated first or second positionally fixed reference point R1 or R2. The positionally fixed reference points R1 and R2 can be located outside the first storage space device 4 at a fixed position inside the bulk material storage space. In an exemplary embodiment, the contactless distance sensors 1 can operate on the basis of the measurement of the transit time of a radio signal, for example, a radar signal. Alternatively, for example, a laser or ultrasound distance sensors can be used.

The evaluation unit 21 can be configured to read in the first and second relative distances A1 and A2 from the distance sensors 1, to determine a rotation V of the first storage space device 4 about its central vertical axis H therefrom and to transmit the rotation V or a compensation information item, serving to compensate the rotation V, to the first control unit 24. The first control unit 24 can be configured to control, on the basis of the rotation V or the compensation information item, the movement of at least one of the foot elements 2 and 3 along the associated rail 5 in such a way that the rotation V can be reduced.

In accordance with an exemplary embodiment, the rotation V can be compensated completely, for example, by corresponding opposing movement of one of the foot elements 2 and 3.

Figure 3:
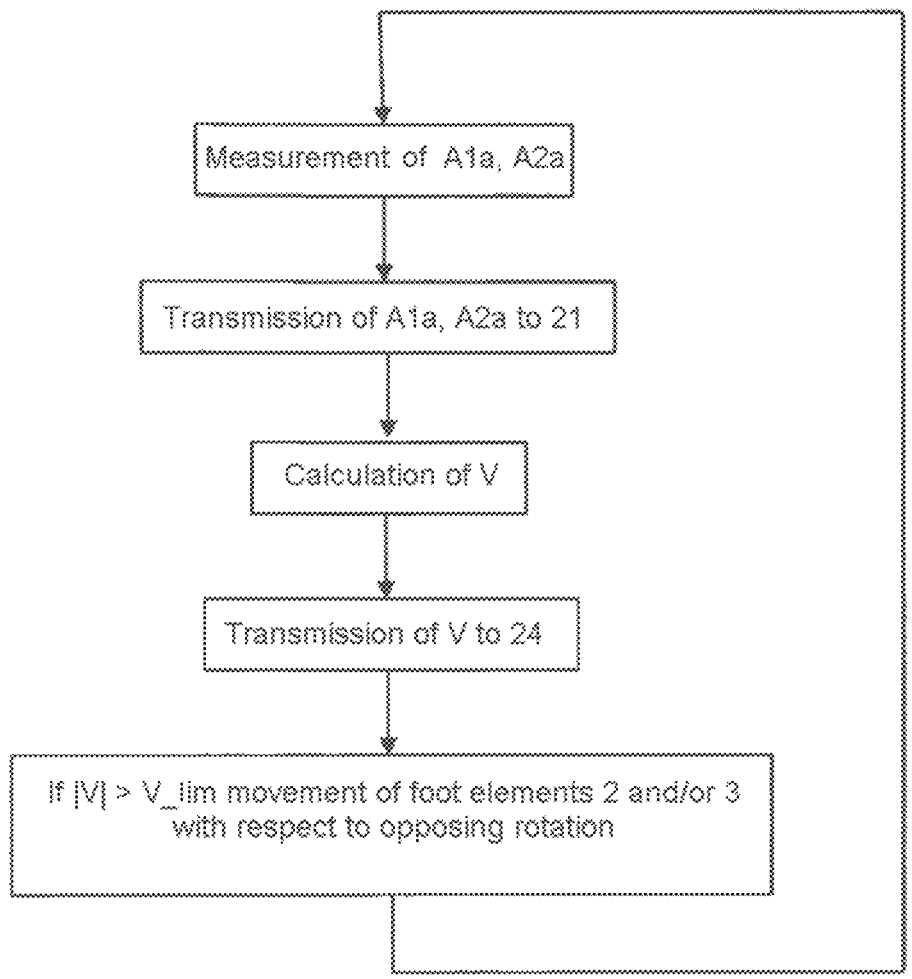
FIG. 3 shows a flowchart of a method for detecting and further processing the position of the first storage space device.

The method steps listed in accordance with an exemplary embodiment of the distance sensors 1, the evaluation unit 21 and the first control unit 24 are illustrated in combination in FIG. 3. Accordingly, the distance sensors 1 can operate continuously, with the result that the first and second relative distances $A1a$ and $A2a$ can be measured repeatedly. The measured first and second relative distances $A1a$ and $A2a$ can be transmitted to the evaluation unit 21, and the rotation V of the first storage space device 4 can be calculated from the relative distances $A1a$ and $A2a$. The rotation V can be transmitted to the first control unit 24 were it is checked whether the value of the rotation V exceeds a previously defined limit V_lim. For example, if this is the case, the running gear units in the first and second foot elements 2 and 3 or the running gear in at least one of the foot elements 2 or 3 are/is actuated in such a way that opposing rotation of the first storage space device 4 about its central vertical axis 4 can be triggered. For example, the movement of the foot elements can be controlled in such a way that the rotation V does not exceed a predefined maximum rotation V_max, wherein for safety reasons in the event of the predefined maximum rotation V_max still being exceeded, the running gear units of the foot elements 2 and 3 can be switched off.

As shown in FIG. 1, a further contactless distance sensor 1 can be arranged at each of the first and second positionally fixed reference points R1 and R2. The distance sensors 1 serve to respectively measure a further relative distance $A1b$ and $A2b$ in the opposing direction between the reference point R1 or R2 and the respectively associated measuring point. The evaluation unit 21 can be configured to adjust the respective further relative distance in the opposing direction $A1b$, $A2b$ with respect to the associated relative distance in the direction between the respective measuring point and the associated reference point $A1a$, $A2a$ for redundancy purposes. In accordance with an exemplary embodiment, the reliability of the respective distance measurement and therefore the reliability of the detection of the skewed position can be increased.

The first storage space device 4 in FIGS. 1 and 2 is illustrated in FIG. 4 in the form of a gantry scraper 1. FIG. 4 includes a plan view of a coal mixing and storage yard, for example, wherein the bulk material 7 is coal. Arranged along the heap of coal can be, next to the gantry scraper 1, a second storage space device 11 in the form of a further gantry scraper 2 and a third storage space device 26 in the form of a spreader. In a screening and crushing station 25, the coal can be comminuted and fed onto a belt conveyor 14. The spreader can pick up the coal from the belt conveyor 14, and deposit the coal into a heap. In accordance with an exemplary embodiment, the spreader can move along a rail 8 and the boom 16 of the spreader is pivotably arranged. A system 17 for electrically supplying and controlling the operation of the spreader can be integrated into the spreader. The system 17 can also include an evaluation unit and a control unit.

In accordance with an exemplary embodiment, the gantry scraper 2 is of analogous design to the gantry spreader 1, for example it also can have two foot elements 9 and 10 as well as a system 12 for electrically supplying and controlling the operation of the gantry scraper 2. In accordance with an exemplary embodiment, instead of the first and second relative distances A1$a$, A2$a$, the contactless distance sensors 1 which are mounted on the gantry scraper 2, can measure a sixth and a seventh relative distance A6$a$ and A7$a$, from which an evaluation unit associated with the system 12 can determine the rotation of the gantry scraper 2 about its central vertical axis. In accordance with an exemplary embodiment, a second control unit associated with the system 12 can determine from an opposing rotation of the gantry scraper 2, which can be used to compensate the rotation, and the second control unit can correspondingly actuate one or both of the running gear units in the foot elements 9, 10. All statements made below with respect to the gantry scraper 1 apply analogously to the gantry scraper 2, wherein, for example, the functionality of the first evaluation unit 21 corresponds to the functionality of the evaluation unit of the system 12.

The coal mixing and storage yard can also include drive stations for the belt conveyor systems 9 and 14 as well as a control room 22 with an evaluation unit 23. The method steps mentioned above for determining the rotation V or the compensation information item can be embodied, instead of in the local evaluation unit of the first or second storage space device 4 or 11, also in the central evaluation unit 23 of the control room 22, for example, the evaluation unit 21 can be configured to receive the first and second relative distances A1$a$ and A2$a$, to determine the rotation V and, if appropriate, the compensation information item therefrom and to transmit these to the first control unit 24.

A third contactless distance sensor 1 can be mounted on the gantry scraper 1 and can serve to measure a third relative distance A3$a$ between the first storage space device 4 and the second storage space device 11. The evaluation unit 21 can be configured to determine, from the third relative distance A3$a$, an imminent collision or undershooting of a predefined safety distance between the first and the second storage space devices 4 and 11, to derive a first collision-avoidance information item therefrom and to pass on the first collision-avoidance information item to the first control unit 24 and/or to a second control unit which can control the movement of the second storage space device 11.

In accordance with an exemplary embodiment, the second control unit can be a component of the system 12 for electrically supplying and controlling the second storage space device 11. In accordance with an exemplary embodiment, collision avoidance between gantry scrapers can be achieved by determining the third relative distance A3$a$.

Furthermore, a collision-avoidance means between the spreader and the gantry scrapers can also be provided. For example, in order to avoid collisions between the spreader and the gantry scraper 1, a fourth contactless distance sensor 1 can be mounted on the third storage space device 26 to measure a fourth relative distance A4$a$ between the third storage space device 26 and a third positionally fixed reference point R4, wherein the evaluation unit 21 or 23 can be configured to determine, from the fourth relative distance A4$a$ and from information about the dimensions of the boom 16 and about its pivoting range, a spatial region which is not to be traveled on by the first storage space device 4, and to determine an imminent collision or undershooting of a predefined safety distance from the spatial region and the first and/or second relative distances A1$a$, A2$a$, to derive a second collision-avoidance information item therefrom and to pass on the second collision-avoidance information item to the first control unit 24 in order to correspondingly correct the movement of the first storage space device 4. In accordance with an exemplary embodiment, a spatial region which is not to be traveled on by the second storage space device 11, for example, of the gantry scraper 2, can be determined from the fourth relative distance A4$a$ or else from fifth relative distance A5$a$, which can be determined between the spreader and a positionally fixed reference point R5, and an imminent collision or undershooting of a safety distance can be detected. In accordance with an exemplary embodiment, the second control unit can help ensure that there is an opposing movement of the gantry scraper 2, which can help avoid the collision.

In addition to the avoidance of collisions between the movable storage space devices, a collision-avoidance means can also be implemented for stationary objects. For example, at least one of the positionally fixed reference points R3, R4 can be located on a stationary object, for example, at the screening and crushing station 25 or at the drive station of the belt conveyor 14. In accordance with an exemplary embodiment, the evaluation unit of the associated storage space device 26 or the evaluation unit 23 of the control room 22 can be configured to determine, from the associated relative distance A4$a$, A5$a$, an imminent collision or undershooting of a predefined safety distance between the associated storage space device 26 and the stationary object, to derive a third collision-avoidance information item therefrom and to pass on the third collision-avoidance information item to the associated control unit, for example, the control unit of the system 17, in order to correspondingly control an opposing movement of the storage space device 26.

In order to generate the compensation information item, serving to compensate the rotation V, and/or in order to generate one of the above-mentioned collision-avoidance information items, the respective evaluation unit exchanges data, for example, parameters relating to dimensions or predefined threshold values, with a data processing unit located at or in the vicinity of one of the storage space devices and/or with a control room of a bulk material storage space can be provided.

In accordance with an exemplary embodiment, the relative distances A1 $a$ to A7$a$ can be measured in their respective opposing direction A1$b$ to A7$b$ for redundancy purposes, as a result of which the reliability and fail-safety of the distance measurement can be improved.

In accordance with an exemplary embodiment, the measured relative distances between the storage space devices and their surroundings can also be used in development to position the storage space devices. For example, in accordance with an exemplary embodiment, a positioning signal can be determined, from the first and second relative distances A1$a$ and A2$a$ and passed on to the first control unit 24 in order to help control the movement of the foot elements 2, 3 of the first storage space device 4 in such a way that the first storage space device 4 assumes a desired position in relation to the bulk material 7.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for detecting and processing a position of at least one storage space device for moving bulk material, wherein a first storage space device has a gantry having two gantry legs with a span of at least several meters, each of the two gantry legs being supported on a linearly displaceable foot element, the system comprising:
   at least one first contactless distance sensor for measuring a relative distance in a direction between a measuring point located on the first storage space device, and a reference point located outside the first storage space device, wherein the at least one first contactless distance sensor is mounted on one of the two linearly displaceable foot elements, for measuring a first relative distance between the one foot element and a first positionally fixed reference point;
   a second contactless distance sensor which is mounted on the other of the two linearly displaceable foot elements, for measuring a second relative distance between the other foot element and a second positionally fixed reference point; and
   an evaluation unit being configured to determine a rotation of the first storage space device about a central vertical axis from the first and second relative distances, and to pass on the rotation information or a compensation information serving to compensate the rotation, to at least one first control unit for controlling a movement of the linearly displaceable foot elements.

2. The system as claimed in claim 1, comprising:
   a third contactless distance sensor which is mounted on the first storage space device, for measuring a third relative distance between the first storage space device and a second storage space device; and
   wherein the evaluation unit is configured to determine, from the third relative distance, an imminent collision or undershooting of a predefined safety distance between the first storage space device and the second storage space device, to derive a first collision-avoidance information item from the determination and to pass on the first collision-avoidance information item to the first control unit and/or to a second control unit which is configured to control a movement of the second storage space device.

3. The system as claimed in claim 2, comprising:
   a fourth contactless distance sensor which is mounted on the second or a third storage space device, for measuring a fourth relative distance between the second or third storage space device and a third positionally fixed reference point, wherein the second or third storage space device has a pivotable boom; and
   wherein the evaluation unit is configured to determine, from the fourth relative distance and from information about dimensions and pivoting range of the boom, a spatial region which is not to be traveled on by the first storage space device, and to determine an imminent collision or undershooting of a predefined safety distance from the spatial region and the first and/or second relative distances, to derive a second collision-avoidance information item and to pass on the second collision-avoidance information item to the first control unit in order to correspondingly correct a movement of the first storage space device.

4. The system as claimed in claim 3, wherein at least one of the first, second, and third positionally fixed reference points is located on a stationary object, and the evaluation unit is configured to determine, from an associated relative distance, an imminent collision or undershooting of a predefined safety distance between an associated storage space device and the stationary object, to derive a third collision-avoidance information item and to pass on the third collision-avoidance information item to an associated control unit in order to correspondingly control the movement of the associated storage space device.

5. The system as claimed in claim 4, comprising:
   a further contactless distance sensor which is arranged at each of the first, second, and third positionally fixed reference points, in order to respectively measure a further relative distance in an opposing direction between each of the positionally fixed reference points and respectively associated measuring point, and wherein the evaluation unit is configured to adjust a respective further relative distance in the opposing direction with respect to the associated relative distance in the direction between the respective measuring point and the associated reference point for redundancy purposes.

6. The system as claimed in claim 1, wherein the at least first and second contactless distance sensors measure a transit time of a radio signal.

7. The system as claimed in claim 1, comprising:
   a data processing unit located at or in a vicinity of one of the storage space devices and/or with a control room of a bulk material storage space, and wherein the evaluation unit exchanges data with the data processing unit to generate the compensation information serving to compensate the rotation, and/or to generate the collision-avoidance information.

8. The system as claimed in claim 1, comprising;
   a data processing unit; and
   wherein the evaluation unit exchanges data with the data processing unit to generate the compensation information serving to compensate the rotation, and/or to generate collision-avoidance information.

9. A system for detecting and processing a position of at least one storage space device for moving bulk material, the system comprising:
   a first storage space device including a gantry having two gantry legs, each of the two gantry legs being supported on a linearly displaceable foot element;
   at least one first contactless distance sensor for measuring a relative distance in a direction between a measuring point located on the first storage space device, and a reference point located outside the first storage space device, wherein the at least one first contactless distance sensor is mounted on one of the two linearly displaceable foot elements, for measuring a first relative distance between the one foot element and a first positionally fixed reference point;
   a second contactless distance sensor which is mounted on the other of the two linearly displaceable foot elements, for measuring a second relative distance between the other foot element and a second positionally fixed reference point; and
   an evaluation unit being configured to determine a rotation of the first storage space device about a central vertical axis from the first and second relative distances, and to pass on the rotation information, or a compensation information serving to compensate the rotation, to at least one first control unit for controlling a movement of the linearly displaceable foot elements.

10. The system as claimed in claim 9, comprising:
    a third contactless distance sensor which is mounted on the first storage space device, for measuring a third relative distance between the first storage space device and a second storage space device; and wherein the evaluation unit is configured to determine, from the third relative distance, an imminent collision or undershooting of a predefined safety distance between the first storage space device and the second storage space device, to derive a first collision-avoidance information item from the determination and to pass on the first collision-avoidance information item to the first control unit and/or to a second control unit which is configured to control a movement of the second storage space device.

11. The system as claimed in claim 10, comprising:

a fourth contactless distance sensor which is mounted on the second or a third storage space device, for measuring a fourth relative distance between the second or third storage space device and a third positionally fixed reference point, wherein the second or third storage space device has a pivotable boom; and wherein the evaluation unit is configured to determine, from the fourth relative distance and from information about dimensions and pivoting range of the boom, a spatial region which is not to be traveled on by the first storage space device, and to determine an imminent collision or undershooting of a predefined safety distance from the spatial region and the first and/or second relative distances, to derive a second collision-avoidance information item and to pass on the second collision-avoidance information item to the first control unit in order to correspondingly correct a movement of the first storage space device.

12. The system as claimed in claim 11, wherein at least one of the first, second, and third positionally fixed reference points is located on a stationary object, and the evaluation unit is configured to determine, from an associated relative distance, an imminent collision or undershooting of a predefined safety distance between an associated storage space device and the stationary object, to derive a third collision-avoidance information item and to pass on the third collision-avoidance information item to an associated control unit in order to correspondingly control the movement of the associated storage space device.

13. The system as claimed in claim 12, comprising:

a further contactless distance sensor which is arranged at each of the first, second, and third positionally fixed reference points, in order to respectively measure a further relative distance in an opposing direction between each of the positionally fixed reference points and respectively associated measuring point, and wherein the evaluation unit is configured to adjust a respective further relative distance in the opposing direction with respect to the associated relative distance in the direction between the respective measuring point and the associated reference point for redundancy purposes; and a data processing unit, and wherein the evaluation unit exchanges data with the data processing unit to generate the compensation information serving to compensate the rotation, and/or to generate one of the collision-avoidance information items.

14. A method for detecting and processing a position of at least one storage space device for moving bulk material, wherein the at least one storage space device has a gantry with two gantry legs with a span of at least several meters, each of the two gantry legs supported on a linearly displaceable foot element, the method comprising:

measuring a relative distance between a measuring point located on a first storage space device, and a positionally fixed reference point located outside the first storage space device with at least one first contactless distance sensor;

measuring a first relative distance between one of the two linearly displaceable foot elements and a first positionally fixed reference point with the first contactless distance sensor which is mounted on the one foot element;

measuring a second relative distance between the other of the two foot elements and a second positionally fixed reference point with a second contactless distance sensor which is mounted on the other foot element;

determining a rotation of the gantry about a central vertical axis from the first and the second relative distances; and passing the rotation information, or a compensation information serving to compensate the rotation, on to at least one control unit for controlling a movement of the two foot elements.

15. The method as claimed in claim 14, comprising:

controlling the movement of the two foot elements such that the rotation does not exceed a predefined, maximum rotation.

16. The method as claimed in claim 14, comprising:

determining a positioning signal from the first and/or second relative distances; and passing the positioning signal from the first and/or second relative distances to the at least one control unit in order to control the movement of the two foot elements such that the first storage space device will assume a desired position in relation to the bulk material.

17. The method as claimed in claim 14, comprising:

measuring a third relative distance between the first storage space device and a second storage space device;

determining an imminent collision or undershooting of a predefined safety distance between the first storage space device and the second storage space device from the third relative distance;

deriving a first collision-avoidance information item; and passing the first collision-avoidance information item on to the at least one control unit being configured to control a movement of the second storage space device.

18. The method as claimed in claim 17, comprising:

measuring a fourth relative distance between the second or a third storage space device and a third positionally fixed reference point;

determining a spatial region which is not to be traveled on by the first storage space device from the fourth relative distance and from information about dimensions and a pivoting range of a pivotable boom located on the second or third storage space device;

determining an imminent collision or undershooting of a predefined safety distance from the spatial region and the first and/or second relative distances;

deriving a second collision-avoidance information item; and passing the second collision-avoidance information item on to the first control unit.

19. The method as claimed in claim 18, comprising:

locating at least one of the first, second, and third positionally fixed reference points on a stationary object;

determining an imminent collision or undershooting of a predefined safety distance between an associated storage space device and the stationary object from an associated relative distance;

deriving a third collision-avoidance information item; and passing the third collision-avoidance information item on to an associated control unit to control a movement of the storage space device.

20. The method as claimed in claim 19, comprising:
measuring relative distance in an opposing direction between at least one of the first, second, and third positionally fixed reference points and an associated measuring point; and
adjusting the relative distance in the opposing direction with respect to the associated relative distance in the direction between the respective measuring point and the associated reference point for redundancy purposes.

* * * * *